Figure 1:
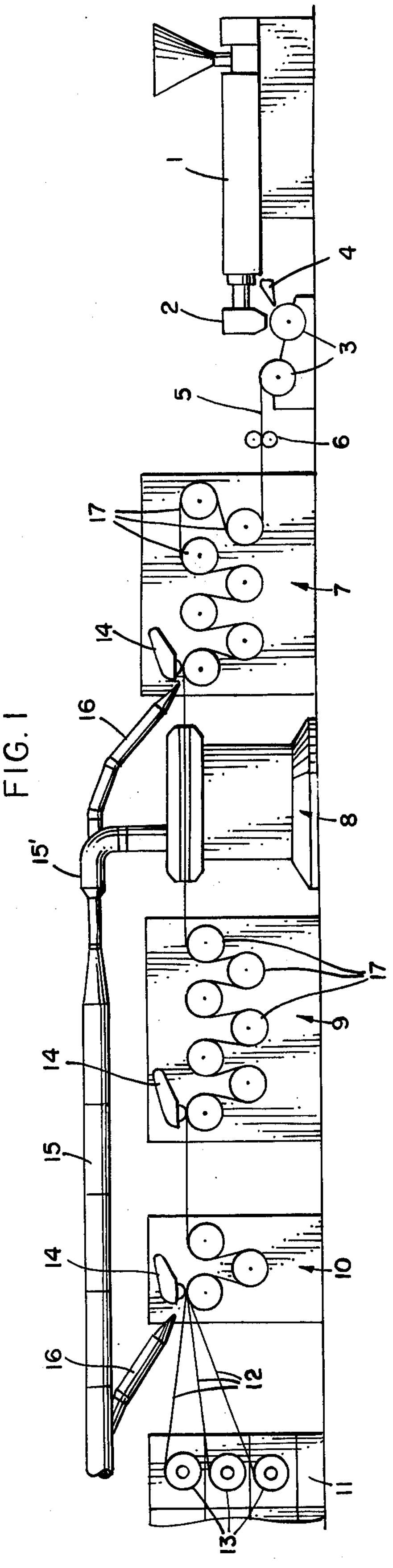

United States Patent [19]

Schippers et al.

[11] 4,113,935

[45] Sep. 12, 1978

[54] PROCESS FOR PRODUCING LOW SHRINKAGE FILM BANDS

[75] Inventors: Heinz Schippers; Friedhelm Hensen, both of Remscheid; Gerhard Koslowski, Hückeswagen; Dieter Czerwon, Hückeswagen-Wiehagen, all of Germany

[73] Assignee: Barmag Barmer Maschinenfabrik AG, Remscheid-Lennep, Fed. Rep. of Germany

[21] Appl. No.: 722,558

[22] Filed: Sep. 13, 1976

Related U.S. Application Data

[63] Continuation of Ser. No. 476,052, Jun.3, 1974, abandoned.

[30] Foreign Application Priority Data

Jun. 6, 1973 [DE] Fed. Rep. of Germany ....... 2328639

[51] Int. Cl.[2] ......................... C08F 10/06; B29D 7/24

[52] U.S. Cl. .................................... 526/351; 264/288; 264/DIG. 73

[58] Field of Search ........... 264/288, DIG. 73, 210 R, 264/234, 342 KE; 526/351

[56] References Cited

U.S. PATENT DOCUMENTS

| | | | |
|---|---|---|---|
| 3,076,232 | 2/1963 | Dengler | 264/288 |
| 3,619,460 | 11/1971 | Chill | 264/288 |
| 3,734,994 | 5/1973 | Blecha | 264/288 |

*Primary Examiner*—James B. Lowe

*Attorney, Agent, or Firm*—Keil, Thompson & Shurtleff

[57] ABSTRACT

A multistage stretching process for producing low shrinkage film bands of a thermoplastic polymer, especially polypropylene, wherein the stretching temperature is increased from one stage to the next under prescribed conditions for each stage and the stretched bands are then heat stabilized with shrinkage in a relaxed condition at a temperature of about 20° C. to 30° C. below the crystalline melting point of the polymer. The resulting film bands are especially useful in carpet backings.

8 Claims, 3 Drawing Figures

PROCESS FOR PRODUCING LOW SHRINKAGE FILM BANDS

This is a continuation of application Ser. No. 476,052, filed June 3, 1974, now abandoned.

This invention is concerned with a process for the production of monoaxially stretched film bands composed of a thermoplastic polymer, especially polypropylene, using a procedure of extruding an amorphous polymer film or foil which is cut into a plurality of individual film bands and then stretching these bands in at least two stages at a temperature above room temperature but below the crystalline melting point of the polymer so as to provide a monoaxial orientation. The stretched and oriented film bands are then heat stabilized and wound onto a spool, reel or other conventional take-up device. The invention is also concerned with the apparatus used for carrying out this process.

It is known from German Patent (DT-PS) No. 913,574 that one may divide an unstretched or amorphous film into several narrow bands which are then spooled in roll form and only subsequently stretched as individual bands. This method of working has the advantage that by reason of the low strength of the nonoriented film, the forces applied by drawing the film sheet through the cutting tool are slight and the cutting tool itself exhibits a substantially longer cutting life than is the case if a stretched film sheet were to be divided into bands by the same cutting tool.

From German Patents (DT-PS) No. 689,539 and No. 715,733, it is also known that one or several film bands of a thermoplastic polymer adjacent one another can be stretched simultaneously to several times their original length as the bands are drawn over heated surfaces and are stretched on these surfaces or directly thereafter. For this purpose, the heated surfaces may be provided by rollers or stationary curved surfaces, for example, over which the films are drawn under a stretching tension.

Foil bands which have been produced according to the known processes can exhibit very different properties, especially with reference to their mechanical characteristics such as tensile strength, elongation at break, modulus of elasticity, dimensional stability at elevated temperatures or the like. One always seeks to improve these characteristics in an appropriate manner to satisfy the requirements of particular uses of the foil bands, but these mechanical characteristics or properties are naturally dependent upon the chemical properties, i.e. the known properties of individual thermoplastic film-forming polymers. On the other hand, it is also known that a suitable variation of the process within certain limits can influence the development of mechanical properties in the desired direction, i.e. by the choice of the limiting stretch ratio of the stretching process. Thus, it is advantageous to divide the stretching process into several stages so as to influence the residual shrinkage of the monoaxially oriented film bands, for example whereby the last stretching stage must follow a heat stabilization at temperatures below the crystalline melting point of the polymer if one is to achieve a lower value for the residual shrinkage.

However, it has not yet been possible to produce satisfactory film bands, especially those of polypropylene, for the preparation of backings for tufted carpets or the like wherein, on account of the high number of picks of the loom having a width of 5 or 6 meters, correspondingly high requirements are placed on the tensile strength of the bands of more than 5 g/den and wherein the heat shrinkage, measured after 3 minutes of tension-free immersion in oil at a temperature of 132° C., should measure 2.0% at the most. These requirements must be met for film bands which are to be processed on high speed looms, on the one hand, so that high filling speeds (of the weft) can be realized without interruptions of production and, on the other hand, so that the most expensive tenter frame previously required for rubberizing at 130° C. can be reduced in cost or avoided. This tenter frame is supposed to prevent the width shrinkage of the carpet backing during the rubberizing step. (Compare the disclosure in "Kunststoffe", Vol. 61, 1971, No. 5, pages 356 ff, especially page 359.)

It is an object of the present invention to provide a process for stretching film bands which will permit a greater degree of safety in producing such bands from a freshly extruded or amorphous and non-stretched film or sheet divided into the individual bands. It is another object of the invention to provide stretched film bands with a residual shrinkage of not more than 2%, measured after a three minute tension-free immersion in oil at 132° C., while preserving the highest or most favorable values of tensile strength and modulus of elasticity. In attempting to achieve these objects, a serious technical problem is presented when conducting the stretching process on an industrial scale because various melt additives introduced into the polymer granulate or powder before extrusion of the film, for example such additives as stabilizers, pigments or the like, must not be permitted to separate out or deposit on the surface of the film bands. If this does occur, the film bands tend to adhere to heated surfaces and also tend to form lappings. Furthermore, it also becomes necessary to solve the problem of achieving good mechanical properties, especially tensile strength and the modulus of elasticity without sacrificing the necessary low shrinkage values below about 2%. The problem appears to be insoluble because it is already known that the use of high temperatures in carrying out the stretching process gives relatively low and undesirable tensile strength values. On the other hand, the use of low temperatures yielding the desired minimum tensile strength causes the residual shrinkage to have values several times the desired value.

In order to solve these problems and to fulfill the objects of the invention, it has now been found that a substantially improved stretching of thermoplastic film bands can be achieved if the initially extruded, amorphous thermoplastic polymer divided into a number of strips or bands is monoaxially stretched in a plurality of separate stages at an elevated temperature above room temperature but below the crystalline melting point of the polymer, the stretching temperature being raised in going from one stretching stage to the next succeeding stage provided that the temperature in the first stage corresponds to that temperature which is sufficient in itself to accomplish a single stage stretching at the desired total stretch ratio and also provided that the raised temperature in each succeeding stage is adjusted to meet the higher temperature resistance of the film bands corresponding to their successively higher order of crystalline orientation, and then heat stabilizing the stretched film bands by heating them to a temperature of between about 20° C. and 30° C. below the crystalline melting point of the polymer while the bands are relaxed sufficiently to permit shrinkage.

The process of the invention is generally applicable to conventional film-forming or fiber-forming thermoplastic polymers including linear polyamides (nylons), linear polyesters (polyethyleneterephthalates), polyolefins and the like, because all such polymers fall within the principle of monoaxially stretching the film bands in stages from their initial amorphous state to a highly oriented crystalline state under controlled conditions and then relaxing at a relatively high temperature to obtain a low shrinkage capacity band or strip of high strength. It will be apparent that the controlled conditions of temperature, stretch or draw ratio, crystalline melting point, relaxation or heat shrinkage, draw tension and similar parameters will vary over a wide range depending upon the selection of the film-forming polymer.

The use of polypropylene in the process of the present invention is of special importance because polypropylene film bands represent a valuable synthetic textile material, especially as a backing material for carpets. Also, polypropylene has been particularly subject to problems in preparing the desired film bands so that the process of the present invention is particularly applicable to this polymer. A polypropylene of high isotactic content is preferred, e.g. of 85% or more, as determined by extraction of the atactic content with boiling n-heptane. The term "amorphous" is employed herein with reference to polypropylene and similar film-forming linear polymers to refer to the extent of crystalline orientation of the polymer in the film band and not to its initial content of unoriented crystallites or so-called micelles. Also, with respect to polypropylene, the terms "amorphous" and "crystalline" are to be distinguished from the "atactic" or "isotactic" content as will be clearly understood by one skilled in this art.

The initial extrusion of the initial polypropylene or other polymer film and its slicing, cutting or similar separation into a plurality of relatively narrow film bands is so well known that elaboration is not required here. In general, however, it is advantageous to provide such bands with a thickness of about 80 to 160 microns and a width of about 3 mm to 6 mm.

Figure 3:
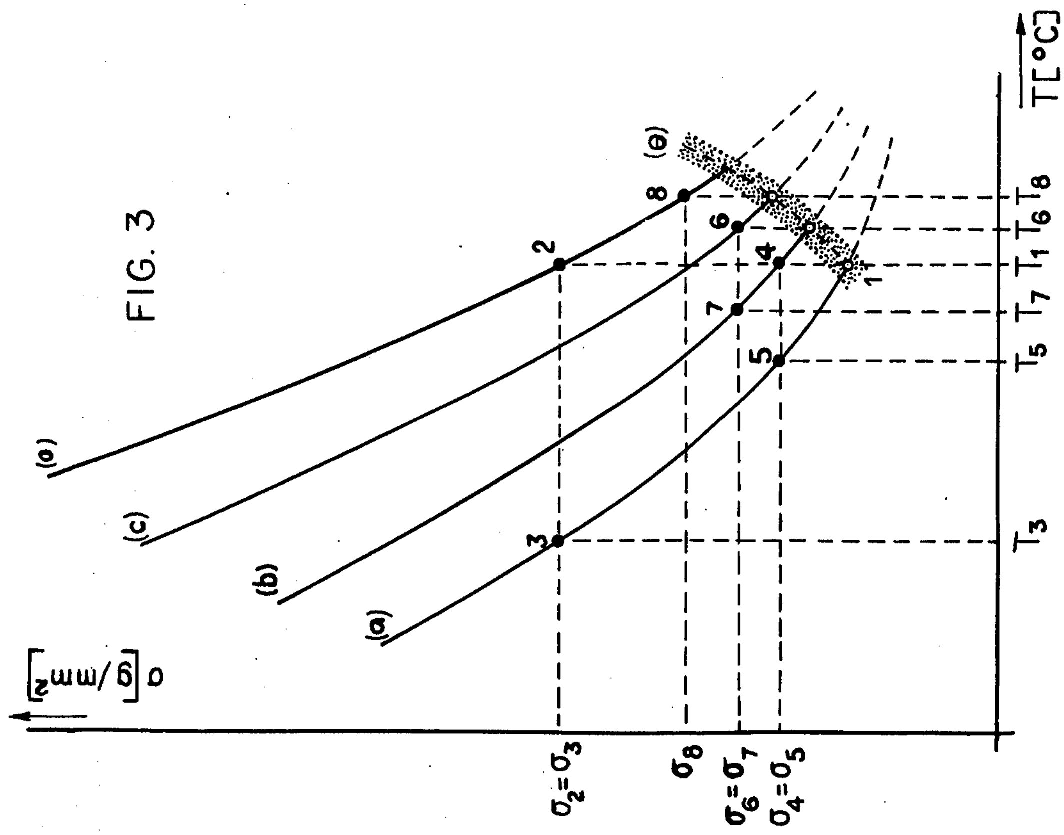
Figure 2:
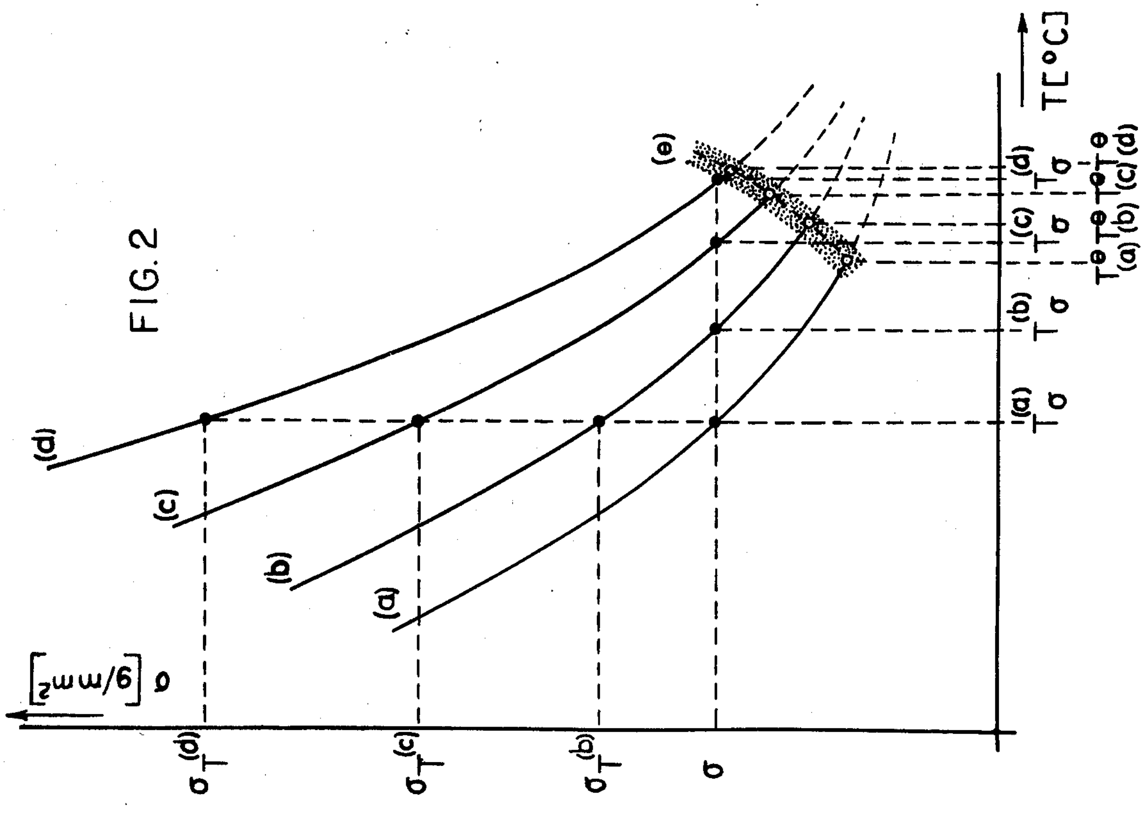

The invention and its objects and advantages are explained in greater detail hereinafter with reference to the accompanying drawings in which:

FIG. 1 is a schematic illustration of apparatus which is especially adapted to the multistage stretching of extruded and cut film bands to provide a low shrinkage product in accordance with the invention;

FIG. 2 is a graphic illustration of the relationship between the stretching tension $\sigma$ and the stretching temperature T of polypropylene film bands according to the stretch ratio as the parameter or individual curve shown in the graph; and FIG. 3 is a graphic illustration as in FIG. 2 but with an added comparison of a single stage band stretching to the multistage band stretching of the present invention wherein substantially lower stretching tensions are required.

Referring first to FIG. 1, the apparatus used in carrying out the process of the present invention essentially includes means for producing the initial film sheet such as a screw extruder 1 equipped with a suitable extrusion die 2 to produce a flat film from the molten polymer at the outlet end of the extruder 1. A cooling device is required for the freshly extruded film such as the cooling rolls 3 which receive and transport the extruded film under a predraw, i.e. with a certain attenuation of the film but without substantial crystalline orientation, i.e. so as to initially draw off a substantially amorphous film. A pressure means 4 is also preferably provided for the film sheet 5 as it is drawn off by the cooling rolls, e.g. a device for directing a gaseous fluid such as air onto the film sheet so as to maintain a more uniform initial film extrusion under controlled conditions. This gaseous pressure medium may also act as a cooling or solidifying means for the freshly extruded polymer film. A cutting device 6 is then provided so as to divide the initial film sheet 5 into a plurality of relatively narrow film bands. This cutting device is then followed by the essential stretching means and heating means of the invention, after which there is preferably employed a suitable winding means to receive or take-up the individual cut and stretched film bands.

At the discharge end of the screw extruder 1, it is also possible to use a die adapted to produce a blown tubular film as another conventional film-producing device in combination with cooling means, means to flatten and guide the film into a double sheet which may then be cut and divided into the narrow film bands or else temporarily stored as a flat wound film for subsequent cutting and stretching in accordance with the invention.

In order to cut the film sheet 5 into the desired width of the individual bands, the cutting device 6 may consist of a number of round knives or a number of fixed blades or the like arranged in a row transversely to the film path so that all film bands are cut at the same time.

After the extruded film sheet 5 is cut into individual bands, they are preferably immediately conducted to the first stretching means 7 consisting of a series of seven rolls or a so-called "septet" in which several stretching stages may be combined. According to the preferred embodiment of the apparatus of the invention, this first stretching means 7 is followed by a convection heating unit 8 such as an oven, a hot air chamber or similar conventional means to apply heat through convection onto the freely suspended film bands. After this heating unit 8, there is provided a second stretching means 9 consisting of another set of seven rolls which again may be used for one or more stretching steps or stages. A set of three rolls or a so-called "trio" 10 acts to withdraw the bands from the second stretching means 9 while also relaxing the bands and permitting shrinkage to take place after the final stretching has occurred. A conventional winding apparatus 11 is then used to take up the treated film bands 12, for example onto a plurality of cross-wound bobbins 13. At the final roll of each of the roll units 7, 9 and 10, an auxiliary roll or pressure roller 14 rests on the film bands in normal operation and can be lifted and turned to one side when applying the film bands. These pressure rollers 14 provide a better controlled feed from the last roll of each unit to the next operation.

In order to capture and withdraw any broken film bands and to prevent so-called "lappings" or "winders" on the rolls or godets at critical points in the apparatus, it is helpful to provide a suction means 15 in the form of a vacuum operated main line equipped with individual feeder lines 16. Breakage of the film band is relatively infrequent when working in accordance with the present invention, and the number and placement of the feeder suction lines 16 can therefore be kept to a minimum. As indicated, behind the heating chamber 8 there is a conduit portion 15' of the main suction line 15 with a pressure fan means or a convenient ejector means — not shown — for generating of the air suction.

For carrying out the multistage stretching process of the invention, it must be possible for the individual godets or rolls 17 of each stretching unit 7,9 to be rotated at different speeds and to be heated to different temperatures. It will be understood, of course, that two, three or more consecutive rolls of each unit for example may be operated in tandem at the same speed and temperature or else each roll may be operated differently to create the maximum number of stretching stages. Also, the second stretching unit 9 is preferably operated at least in the last portion thereof as means to relax the film bands at an elevated temperature. The apparatus of the invention thus offers a very wide variety of useful stretching conditions for the film bands.

The multistage stretching process of the invention is further explained in greater detail with reference to the graphical presentation in FIGS. 2 and 3.

In both FIG. 2 and FIG. 3, the stretching tension $\sigma$ required to stretch a film band is plotted against the corresponding stretching temperature T. The individual curves or parameters (a), (b), (c) and (d) represent different degrees of crystalline orientation as measured by a given stretch ratio in each case. The exact position and path of each curve is dependent upon the particular film-forming polymer being used, and for this reason the graphs are presented in a qualitative manner rather than giving absolute values of tension and temperature. Such curves must be individually determined for each polymer.

For purposes of illustration, curve (a) is intended to represent the relationship between stretching tension and temperature for an initially unstretched and substantially amorphous film band. Thus, each point along the curve shows the combination of tension and temperature at which the film band just begins to flow, or viewed in another way, the temperature is plotted against the tension to which the band can be subjected at such temperature without deformation. One may also refer to the curves as representing the "stretch points" where any increase of either the temperature or the stretching tension will cause the film band to stretch or flow with the characteristic formation of a bottleneck. This bottleneck or "necking down" process occurs in both fibers and films when stretching at temperatures below the crystalline melting point of the polymer material. For a more complete discussion of "necking down" and the so-called "cold drawing" below the crystalline melting point, attention is directed to such references as "Textbook of Polymer Chemistry" by Billmeyer, Jr., Interscience Publishers, Inc., N.Y. (1957) pp. 21 ff.

Curves (b), (c) and (d) show these "stretch points" for the same polymer which has been previously stretched to a progressively higher degree of crystalline orientation, i.e. to a higher stretch ratio, in going from (a) to (b) to (c) and then to (d). In other words, where (a) is the unstretched film band, (b) is the film band after a first stage stretching, (c) is the same film band after a second stage stretching and (d) is the same film band after its "final stretching". All of the curves show that with equal tension, a more highly prestretched film can be subjected to a higher temperature before the "stretch point" is reached.

For example, with reference to FIG. 2, the stretching tension $\sigma$ of the unstretched film band (a) can be plotted over to the temperature $T_\sigma^{(a)}$ in comparison to the higher temperature $T_\sigma^{(b)}$ of the stretched film band (b) along its curve or to the still higher temperatures $T_\sigma^{(c)}$ and $T_\sigma^{(d)}$ of the still more highly stretched film bands (c) and (d) according to their individual curves. On the other hand, the diagram of FIG. 2 also shows that plotting vertically along a line of constant temperature $T_\sigma^{(a)}$, progressively higher tensions are required to induce stretching as the film bands become more stretched or oriented, i.e. in proceeding from the tension $\sigma$ for the unstretched film band (a) up to tension $\sigma_T^{(b)}$ for the initially stretched band (b), then up to tension $\sigma_T^{(c)}$ for the further stretched band (c) and then up to tension $\sigma_T^{(d)}$ for the band (d) of "final stretch".

The so-called "final stretch" of a film band is an expression employed herein to designate a band which has been stretched to its maximum useful extent, e.g. up to a stretch ratio of approximately 1:8 and ordinarily never more than about 1:9. Those curves which represent a higher stretch ratio (not illustrated) are of only minor interest for the present invention and are generally useful only in special cases, e.g. in producing the stranded ropes or so-called split fiber yarns. These curves, representing a stretch ratio on the order of 1:9 would in any case lie very close together and near the curve (d).

The "stretching tension" refers to the amount of tension or unit stress being placed upon the film in grams (force) per square millimeter, abbreviated herein as $g/mm^2$, and taken with reference to the cross-sectional area of the unstretched film.

For purposes of the present invention, it is especially advantageous to select the temperature in each successive stretching stage in such a manner that the "stretching tension" in each of the several stages (taken with reference to the cross-section area of the unstretched band) is maintained within limits of approximately 200 $g/mm^2$ to 1,000 $g/mm^2$. Once the film band is finally stretched, it is then also very advantageous at the high temperatures used for the heat stabilization and at the film velocity in the relaxation zone to employ a tension in the relaxation zone of not more than about 400 $g/mm^2$ but at least about 70 $g/mm^2$ (in this case with reference to the cross-sectional area of the stretched film).

Referring again to FIGS. 2 and 3, a limiting curve $\Theta$ is given by definition in the present application as a series of upper limiting temperatures for each stretching stage where it is still possible to carry out the process in a reliable manner. The curve $\Theta$ connecting these upper temperature limits essentially represents the highest temperature which can be endured by each film band during stretching and is dependent upon the degree of crystalline orientation of each film band.

The identification of a "reliable operation" at these higher temperatures is somewhat subjective and difficult to determine, and for this reason the limiting curve $\Theta$ is shown within a shadded tolerance zone in order to clearly represent this curve as an approximation of the upper limiting temperatures of the invention.

Certain objective citeria for establishing operating reliability can be mentioned as follows. For example, the temperature of the contact heating body, e.g. a heated roller, godet or other element in contact with the film band, must be chosen at its highest limit such that an adhesion or sticking of the film band onto the heated surface does not occur. Also, no lapping or formation of "winders" should be permitted to occur due to sticking on godets or rollers with a rupture or tearing of the film band. Instead, the film bands must be safely drawn around or across and away from all contact heating elements and must also be maintained separate from one another. Where there is an occasional tearing of a film band wth rethreading (due to a lower temperature resistance as may occur where there has been an insufficient degree of orientation), it must be possible to reintroduce the film band without renewed tearing. When heating by convection, one should avoid an excessively turbulent air stream which may cause a fluttering of the bands as they are conducted parallel to one another and a sticking together of adjacent bands if they contact each other. Finally, it is desirable to prevent the secretion or liberation of stabilizers or other additives from the film onto the heated surfaces.

Through a number of preliminary tests, one can very quickly determine the upper temperature limits of all heating steps and maintain the temperatures close to but below the upper operating limits as established by the curve Θ with its so-called tolerance zone.

It will be noted that this limiting curve Θ also establishes the fact that the permissible temperature applied to the film band rises with the degree of orientation. The points at which this limiting curve Θ crosses the individual curves (a), (b), (c) and (d) have been designated in FIG. 2 by the abscissa temperatures $T_{(a)}^{\Theta}$, $T_{(b)}^{\Theta}$, $T_{(c)}^{\Theta}$ and $T_{(d)}^{\Theta}$, respectively.

The diagram provided by FIG. 3 illustrates the conventional single stage stretching process in comparison to the multistage stretching process of the invention which is carried out at substantially lower stretching tensions. In both cases, the stretching temperature T at the beginning of the process is taken at the highest permissible temperature $T_{(a)}^{\Theta} = T_1$ for the unstretched film band. In order to attain the desired final stretch ratio according to curve (d) by using the conventional process, a stretching tension of $\sigma_2$ must be provided. However, with the condition that this stretching tension must remain constant in a single stage operation, it will be found that the initial unstretched film band cannot take up the relatively high tension $\sigma_2$ and the beginning of the bottleneck reduction of the film band, i.e. the place where "necking down" begins, runs back to the point 3 of the diagram where the band temperature $T_3$ is reached and where the high stretching tension $\sigma$ of the film band can be taken up. In other words, an equilibrium state is then reached only at the lower temperature $T_3$ in this single stage operation.

In the multistage process according to the invention, the temperature selected for the first stage is likewise $T_1 = T_{(a)}^{\Theta}$. Because of the limited stretch ratio to be accomplished in the first stretching stage, e.g. as represented by the stage progression between the curves (a) and (b), the tension acting on the film bands between fixed draw points of this first stage is the stretching tension $\sigma_4$, corresponding to point 4 in FIG. 3. The initially unstretched band of curve (a) can take up this tension only at point 5 at the equilibrium temperature $T_5$. In the second stretching stage where the film band corresponds to curve (b), the elevated stretching temperature $T_6 = T_{(b)}^{\Theta}$ corresponding to the higher temperature resistance of the partially stretched and preoriented band is then applied in accordance with the invention. The second stage stretching is carried out up to the next higher stretch ratio corresponding to curve (c), during which the stretching tension $\sigma_6$ prevails, i.e. the tension at point 6 on curve (c). The prestretched band cannot take up this tension so that the beginning of the stretching, i.e. the start of the necking down, theoretically runs back to point 7 on curve (b) with the corresponding equilibrium temperature $T_7$. However, under the limiting condition that the temperature of this second stage ($T_7$) must be at least equal to and preferably greater than $T_4 = T_1$, it will be found as a practical matter that the beginning of the necking down actually runs back at most to the last contact roll or heated member of the preceding first stretching stage where it is localized by reason of the friction present at this point.

The same analysis can be applied to the third or last stretching stage which occurs between curves (c) and (d). Thus, the film band prestretched according to curve (c) is heated to the limiting temperature $T_8 = T_{(c)}^{\Theta}$ and stretched to point 8 where the desired final stretching according to curve (d) is reached while applying the corresponding stretching tension $\sigma_8$. This last stretching tension of the multistage process of the invention is substantially smaller than the tension $\sigma_2$ which is required in the single stage process, and even this maximum tension $\sigma_8$ amounts at most to 1,000 g/mm$^2$ (taken with reference to the cross-sectional area of the unstretched film band).

If a single stage stretching were to be carried out with this lower stretching tension $\sigma_8$, then it is apparent from FIG. 3 that stretching temperature $T_8$ would be theoretically required. Such a process, however, cannot be realized in practice because the unstretched film band is totally incapable of withstanding this high temperature. During threading of the apparatus at the beginning of the process or when rethreading after a breakage, the film band at this temperature would be melted, torn apart or at least become adhered or form winders. Therefore, in carrying out a single stage stretching, one cannot employ a temperature higher than $T_1$ with stretching actually occurring at a position corresponding to the equilibrium temperature $T_3$ and requiring the correspondingly high tension or unit stress $\sigma_2 = \sigma_3$.

The present invention proceeds from a large number of tests which confirm the fact that an optimum stretching of film bands can be achieved only under certain critical conditions so as to obtain both the desired dimensional stability (low residual shrinkage at high temperatures) and also high values for tensile strength and the modulus of elasticity. Thus, these improved results arise only if the total stretching of the film bands is carried out in a plurality of successive stages wherein the temperature is consistently raised from stage to stage in the direction of travel of the bands, i.e. as the bands are progressively stretched.

Furthermore, one must recognize that the most appropriate and essential conditions for this multistage stretching process do not occur simply by stretching in stages. Thus, because of the so-called "necking down" process, certain other precautions must also be taken into consideration if one is to ensure the desired improvement.

For example, it has been found to be advisable in most cases using typical film-forming polymers such as polypropylene to hold the initial or first stage stretching to a stretch ratio of not more than about 1:3, preferably so as to carry out not more than about one-third of the total stretching in this first stage. It will be understood that this limitation is somewhat dependent upon the polymer itself and the desired total stretching which is usually about 1:6 to 1:9, preferably about 1:7 to 1:8. At the very most, the first stage stretching will not exceed one-half the total stretching.

Where stretching is carried out in any single stage procedure while selecting a stretch ratio of greater than 1:3 (three times the original length of the unstretched film), then it will always be found that the beginning of the necking down or so-called "geometrical stretch initiation" gradually wanders back into a region where a band temperature exists which is very substantially below the desired optimum stretching temperature. This beginning of the necking down is stabilized at this point where the stretching tension applied by the drawing device brings the film band with its corresponding lower stretching temperature just up to its flow condition. When stretching at this technologically feasible but lower band temperature according to the known method, there results an undesirably high shrinkage capacity which can be compensated only by relaxation at again very high temperatures while accepting a considerable loss of strength of the stretched film bands.

According to the process of the present invention, the beginning of the necking down configuration of the film bands wanders back only up to the beginning of each individual stretching stage where it is a suitable choice of staging intervals and the use of the appropriate temperatures in each stage. Thus, the winding friction or contact friction of the film bands on the associated transporting means, e.g. such as conventionally heated and preferably rotatably driven rolls or godets which may also be located between stretching stages, and also the recommended adjustment of the stretching temperature together with a lower stretching tension all work against the wandering or shifting back of the necking down or initial point of stretching which in fact governs the degree of crystalline orientation of the film band. In this way, the stretching always takes place with the stretching temperature being raised from one stretching stage to the next and with this temperature being correlated with the total degree of crystalline orientation while always maintaining a stretching tension between about 200 and 1000 g/mm$^2$.

The film bands stretched according to the recommended multistage procedure initially exhibit a lower shrinkage capacity as a result of the lower stretching tensions employed. This in turn permits a subsequent heat stabilization under relaxation to provide a very extensive lowering of the residual shrinkage value, i.e. to a value below 2%. The stabilizing and relaxation treatment according to the invention is carried out especially advantageously under a tension of from 70 up to not more than 400 g/mm$^2$ and at a temperature between about 20° C. to 30° C. below the crystalline melting point of the polymer film. In general, this relaxation temperature is chosen so as to correspond to the highest possible treatment which may be expected during subsequent processing or use of the stretched film band product. However, the given limiting temperature values should not be exceeded in this stabilizing or relaxation treatment if one is to avoid a substantial reduction in tensile strength. It is generally desirable to provide a stretched film band product with a minimum tensile strength of about 5 g/denier. Only the present invention offers a practical means of achieving this high strength while reducing the residual shrinkage value below 2%.

In conducting the process of the invention, it is also especially favorable if the film bands after being stretched in the first stages is then maintained in the last stretching stage at a constant stretching temperature over a length of at least about 80 cm. For this purpose, the foil bands in the last stretching stage are preferably heated at first by suitably heated rolls or godets and then by convection heating, e.g. with hot air. The last stage represents the maximum elevated temperature to which the previously stretched and partly oriented film band must be brought, and it has been found that this often required a combined heating on rollers and a convection heating.

There are also a number of preferred variations or special embodiments in the apparatus of the invention. As noted above, it is desirable to provide means to regulate the heating and driven rotation of the rolls or godets, either individually and/or in groups. At least two godets or rolls are needed to provide a single stretching stage, and it is preferred to arrange two or more stretching stages in sequence on one structural unit. In order to heat the film band during stretching, at least one of the rolls in each stretching stage must be provided with heating means and preferably so that the roll temperatures of one group or from roll to roll are individually adjustable. This is easily accomplished with conventional electrical resistance or induction heating of the rolls or even by using steam for supplying heat internally of the rolls.

Between two driven contact rolls arranged one after the other in the direction of the band travel, it is also possible to provide a fixed contact heating plate in the form of a generally known curved convex heating plate. These plates are arranged between transporting rolls, for example, in such a manner that the film bands are drawn away over each heated plate under an adjustable normal or axial force within the lower tension requirements of this invention. Channeled heating plates where there may be some convection heating of each film band drawn through a heated channel are especially useful. However, it is preferred to carry out the heating of the film band by means of heated rotating rollers or godets where the ratio of friction is much more favorable. Thus, one attempts to reduce frictional action on the film bands as much as possible, e.g. using rotating rollers for contact heating or else a convection heating where there is little or no friction.

The convection heating in the last stretching stage is preferably carried out in an oven or other elongated heating chamber supplied with an inert hot gas, preferably air or an inert industrial waste gas. Both the gas temperature and velocity should be carefully regulated in order to maintain a trouble-free operation.

In order to stretch film bands of different thermoplastic polymers on the same apparatus, it is advantageous to construct the stretching unit in such a manner that the threading or path of travel in at least one stretching stage is adjustable. For this purpose, at least one stretching roll or godet is preferably mounted relative to its adjacent rolls in the direction of band travel so as to be pivotable to one or both sides of the band path. In other words, one or more rolls should be adjustable to vary the length of the path of travel of the band through at least one stretching and preferably through each of the stretching stages.

For changing the stretching path of the band, it is also favorable to mount one stretching roll in a vertically adjustable manner relative to the adjacent stretching rolls.

These and similar minor variations in the construction of the stretching apparatus as well as variations in the permitted process conditions can be readily made by one skilled in this art without departing from the essential scope of the invention.

In order to carry out the process on the apparatus shown in FIG. 1 and in the manner represented by the diagrams of FIGS. 2 and 3, the following examples are given by way of illustration not only of the process according to the invention but also to provide a comparative example.

In both examples, the polymer film being treated is a commercial polypropylene film identified as Hostalen PPN1060F. This is a film-forming linear polyolefin polymer which has been produced by extrusion and cut into substantially non-oriented film bands with the following measurements:

Width = 6 mm.

Thickness = 132 microns

Cross-sectional area = 0.79 $mm^2$.

In order to set up the apparatus, especially for the multistage operation according to the present invention, the godets or rolls 17 of the first stretching unit 7 should be capable of being driven at different rotational velocities and also of being heated to different temperatures. In the example of the invention given here for illustration, the first five rolls 17 arranged sequentially in the direction of band travel on the stretching unit 7 are driven at a constant velocity such that no stretching occurs with reference to the preceding initial draw-off and cooling means 3. The sixth roll is then driven at an increased rotational velocity so that stretching takes place between the fifth and sixth rolls. The ratio of the rotational speeds corresponds essentially to the stage progression between the curves (a) and (b) in FIGS. 2 and 3. The seventh or last roller of the stretching unit 7 is operated at a still higher rotational velocity so that a further stretching takes place corresponding to the stage progression between curves (b) and (c) in FIGS. 2 and 3.

The first three rolls of the stretching device 7 are unheated while the fourth and fifth rolls are heated to the temperature $T^{\Theta}_{(a)}$ as shown in FIG. 2, such that the film bands are heated up to the initial temperature required for the first stretching stage without exceeding the limiting temperatures of the curve Θ, i.e. staying within the shaded "tolerance zone" of this curve. The sixth roll is heated to the temperature $T^{\Theta}_{(b)}$ while the seventh roll is maintained at the temperature $T^{\Theta}_{(c)}$, again as indicated in FIG. 2.

In the hot air zone of the convection heating chamber 8, the temperature is set to the same value as the preceding final roll of the stretching device 7, i.e. at about $T^{\Theta}_{(c)}$.

The rolls of the second stretching device 9 are all driven at a constant rotational velocity. The speed of the rolls of this "septet" 9 are set up to provide an increased velocity over the last roll of the unit 7 which corresponds to the desired increase in stretch for the third stage as represented by the interval between curves (c) and (d) of FIGS. 2 and 3. The first two rolls of the unit 9 are usually unheated while the next five rolls are heated to the required relaxation or heat stabilizing temperature, i.e. above the temperature of the last stretching stage and generally about 20° C. to 30° C. below the crystalline melting point of the polymer film. The three rolls referred to as a "trio" of the draw-off device 10 are also unheated. These final transporting rolls or "trio" are operated at a constant rotational speed, preferably with continuous regulation, so that the film bands can take up the complete shrinkage between the final stretching and stabilizing apparatus 9 and the final draw-off device 10 before they are wound onto bobbins 13. Thus, relaxation is generally completed when the film bands leave the last roll of the "trio" with its auxiliary pressure roll 14.

The following specific working examples are carried out to provide a careful comparison between the prior art single stage procedure (Example 1) and the simplest two stage procedure according to the present invention. For this purpose, the same polypropylene film with the dimensions noted above are used in both instances, i.e. a substantially non-oriented commercial polypropylene film as freshly extruded and cut to the specified width.

EXAMPLE 1

In this comparative example, the polypropylene film bands are subjected to a single stage monoaxial stretching at a stretching ratio of 1:7, using both heated stretch rolls and convection heating between these rolls, thereby making it possible to maintain a stretching temperature of 138° C. The stretching force applied to each individual band amounts to 1,100 grams which represents a stretching tension or unit stress of 1,395 g/$mm^2$, calculated with reference to the cross-section of the unstretched band (0.79 $mm^2$). After stretching, the shrinkage of the film band in the relaxation step amounts to 9.8%. This relaxation is carried out at a temperature of 140° C.

The dimensions of the resulting stretched and heat treated film band are as follows:

Width = 2.3 mm.

Thickness = 50 microns

Cross-sectional area = 0.115 $mm^2$.

This represents a yarn size (titer) of 945 denier. The important physical characteristics of this film band after stretching in a single stage are as follows:

Tensile strength = 5.8 g/denier

Elongation at break = 24%

Residual shrinkage = 4.9% (Measured at 132° C.)

EXAMPLE 2

In this example carried out as a multistage monoaxial stretching in accordance with the invention, the same polypropylene film bands as used in Example 1 are stretched in the same total ratio of 1:7 but in two stages, i.e. in a first stage at a stretching ratio of 1:2.4 between heated rolls and then in a second stage at a stretching ratio of 1:2.9 between heated rolls and an additional convection heating zone. The stretching temperature in the first stage amounts to 130° C. (band temperature = roll temperature). In the second stage, the stretching temperature is 150° C. (band temperature). The stretching rolls of the second stage, between which is arranged the convection heating zone, are heated up to 145° C. A stretch force of 300 grams is applied to the film bands (each band) in the first stage while a force of 615 grams is applied in the second stage. These forces correspond to a stretching tension of 380 g/$mm^2$ and 778 g/$mm^2$ in the first and second stages, respectively, measured with reference to the initial cross-sectional area of the unstretched film band. The shrinkage imposed in the relaxation of the stretched film bands amounts to 5.7%, the relaxation temperature being 140° C. The force applied to the individual bands during the relaxation step is 25 grams, i.e. a draw-off tension of 217 g/$mm^2$, taken with reference to the cross-sectional area of the stretched film band.

The resulting film band product has the dimensions:

Width = 2.3 mm.

Thickness = 50 microns

Cross-sectional area = 0.115 $mm^2$.

Each band exhibits a yarn size (titer) of 954 denier. The band product also has the following properties:

Tensile strength = 5.5 g/denier
Elongation at break = 26%
Residual shrinkage = 0.9% (Measured at 132° C.)

Similar comparisons carried out in accordance with the prior art and the present invention will also readily show that it is essential to perform a multistage stretching of the film bands under the conditions prescribed herein if one is to achieve a high tensile strength with good elongation properties as well as a very low value of residual shrinkage. Moreover, to attain the required elevation or increase in temperature from one stretching stage to the next, it is necessary to stabilize the necking down point, i.e. to prevent this necking down point from wandering back to the preceding stage or to a location of much lower temperature. This stabilization is greatly facilitated by using apparatus in which the film band is properly maintained at prescribed temperatures over a sufficient length, e.g. by means of a convection heating chamber, and advantageously with the use of stretching rolls of the same temperature at the beginning and the end of a stretching stage. In this manner, the stretching process of the invention is carried out with a distinct necking down in each stage at progressively higher orders of crystalline orientation and at corresponding progressively higher temperatures with slightly increased stretching tensions being applied in each stage.

The initial temperature, i.e. that of the first stretching stage, should be the same as the temperature ordinarily used for a single stage stretching of the same film band. In particular, this is preferably the maximum permissible temperature which can be reasonably taken up by the initially unstretched film band as indicated by the temperature $T^{\ominus}_{(a)} = T_1$ of the drawings and especially by the limiting curve Θ or so-called "tolerance zone" as the approximate maximum temperature for any individual stretching stage. It will be understood that one should not exceed these maximum limiting temperatures in each stage and also that one cannot reduce the temperature significantly below these maximum temperatures in each stage. Thus, the second stage band temperature is preferably maintained above the upper or maximum temperature of the first stage; the third stage band temperature is maintained above the maximum temperature of the second stage; and so forth.

The stretching tension, on the other hand, is always maintained as low as possible, i.e. such that it is just sufficient to cause flow and a noticeable necking down in each stage. The final draw-off tension under relaxation or shrinkage of the band should also be maintained within the prescribed limits to ensure satisfactory results.

The film bands produced according to the invention, especially those consisting of polypropylene, exhibit outstanding properties not otherwise achieved and are especially characterized by their low shrinkage values of less than 2% and preferably less than 1%. In addition to their use in carpet backings, the film band products of the invention can be woven or otherwise formed into other textile or stranded products requiring dimensional stability as well as high strength.

The invention is hereby claimed as follows:

1. A multistage stretching process for producing monoaxially stretched film bands of a thermoplastic film-forming polypropylene polymer having a residual shrinkage of less than 2% at a test temperature of 132° C., said stretching being applied to the initially extruded, amorphous polymer film divided into a plurality of said film bands, which process comprises:

monoaxially stretching said film bands in a plurality of separate stages at a temperature above room temperature but below the crystalling melting point of the polymer;

raising the stretching temperature in going from one stretching stage to the next stage;

maintaining the stretching temperature in each stage at a high maximum value $T^{\ominus}$ corresponding to that which in itself would be sufficient to accomplish a single stage stretching at the total desired stretch ratio but at the same time limiting the stretching tension to a low value $\sigma$ considerably below the stretching tension required at said temperature value $T^{\ominus}$ to produce the total desired stretch ratio, with the proviso that the first stage stretching is not more than one-third the total stretching;

adjusting the raised temperature in each succeeding stage to a new maximum value $T^{\ominus}$ corresponding to the higher temperature resistance of the film bands based upon their order of crystalline orientation;

and then heat stabilizing the stretched film bands after the final stretching stage by heating them at a temperature of between about 20° C. to 30° C. below the crystalline melting point of the polymer while the bands are relaxed sufficiently to permit shrinkage.

2. A process as claimed in claim 1 wherein the polypropylene polymer has an isotactic content of at least 85%, as determined by extraction of the atactic content with boiling n-heptane.

3. A process as claimed in claim 1 wherein the stretching temperatures of the individual stages are selected such that the corresponding stretching tensions in each successive stage are between 200 and 1,000 grams/mm², taken with reference to the cross-sectional area of the unstretched film band.

4. A process as claimed in claim 1 wherein the draw-off tension applied to the stretched film band in the heat stabilization and relaxation zone is at least 70 grams/mm² but not more than 400 grams/mm², taken with reference to the cross-sectional area of the stretched film band.

5. A process as claimed in claim 1 wherein the film bands in at least the last stretching stage are maintained at a constant temperature over a band length of at least 80 cm.

6. A process as claimed in claim 1 wherein the film bands in the last stretching stage are heated first by heated stretching rolls and then by convection heating.

7. The polypropylene film band product obtained by the process of claim 1 having a tensile strength of at least 5 g/denier and a residual shrinkage value below 2%.

8. The product as claimed in claim 7 in which the residual shrinkage value is less than 1%.

* * * * *

UNITED STATES PATENT AND TRADEMARK OFFICE

CERTIFICATE OF CORRECTION

PATENT NO. : 4,113,935

DATED : September 12, 1978

INVENTOR(S) : Schippers et al

It is certified that error appears in the above-identified patent and that said Letters Patent are hereby corrected as shown below:

In column 14, line 10, in Claim 1:

change "crystalling" to read --crystalline--.

Signed and Sealed this

*Nineteenth* Day of *June 1979*

[SEAL]

*Attest:*

RUTH C. MASON
*Attesting Officer*

DONALD W. BANNER
*Commissioner of Patents and Trademarks*